United States Patent
Gayles et al.

(10) Patent No.: US 9,578,117 B2
(45) Date of Patent: Feb. 21, 2017

(54) SERVICE DISCOVERY USING A NETWORK

(71) Applicant: AMAZON TECHNOLOGIES, INC., Reno, NV (US)

(72) Inventors: Edward James Gayles, Tracy, CA (US); Ruoruo Zhang, Santa Clara, CA (US); Vlad Troyanker, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 327 days.

(21) Appl. No.: 14/088,878

(22) Filed: Nov. 25, 2013

(65) Prior Publication Data
US 2015/0089038 A1 Mar. 26, 2015

Related U.S. Application Data

(60) Provisional application No. 61/880,681, filed on Sep. 20, 2013.

(51) Int. Cl.
G06F 15/173 (2006.01)
H04L 29/08 (2006.01)
H04L 12/24 (2006.01)
H04N 21/436 (2011.01)
H04N 21/442 (2011.01)
(Continued)

(52) U.S. Cl.
CPC ......... *H04L 67/22* (2013.01); *G06F 17/30126* (2013.01); *G06F 17/30867* (2013.01); *H04L 41/00* (2013.01); *H04L 67/16* (2013.01); *H04N 21/43615* (2013.01); *H04N 21/44222* (2013.01); *H04N 21/44231* (2013.01); *H04N 21/472* (2013.01); *H04N 21/488* (2013.01)

(58) Field of Classification Search
CPC ...................................................... H04L 41/00
USPC ........................................................ 709/223
See application file for complete search history.

(56) References Cited

U.S. PATENT DOCUMENTS 5,572,442 A 11/1996 Schulhof et al.
6,148,261 A 11/2000 Obradovich et al.
(Continued)

OTHER PUBLICATIONS

Fan, John, "Non-Final Office Action dated Jul. 28, 2015", U.S. Appl. No. 14/093,943, The United States Patent and Trademark Office, Jul. 28, 2015.
(Continued)

*Primary Examiner* — Glenford Madamba
(74) *Attorney, Agent, or Firm* — Lindauer Law, PLLC

(57) ABSTRACT

Described are techniques and systems for service discovery on a network. A media device on the network generates a signature indicative of a particular set of one or more services available for execution on the media device. The signature may be distributed on the network using beacon transmissions from the media device. A receiving media device compares the signature with previously stored service data which associates signatures with service sets. The stored service data may include a local signature indicative of a local service set. Determinations of a match result in the receiving media device using the previously stored data. Unmatched signatures may result in the receiving media device sending a request for service set data. The received service set data may then be used to provide service availability information. The received service set data and associated signature may be added to the stored service data.

20 Claims, 8 Drawing Sheets

(51) Int. Cl.
  *H04N 21/472* (2011.01)
  *H04N 21/488* (2011.01)
  *G06F 17/30* (2006.01)

(56) References Cited

U.S. PATENT DOCUMENTS

| | | |
|---|---|---|
| 6,216,158 B1 | 4/2001 | Luo et al. |
| 6,886,178 B1 | 4/2005 | Mao et al. |
| 8,255,359 B2 | 8/2012 | Quinlan et al. |
| 8,270,297 B2 | 9/2012 | Akasaka et al. |
| 8,443,382 B2 | 5/2013 | Taylor |
| 8,612,874 B2 | 12/2013 | Zaman et al. |
| 2002/0013852 A1 | 1/2002 | Janik |
| 2004/0186882 A1 | 9/2004 | Ting |
| 2007/0153731 A1* | 7/2007 | Fine ............... H04L 25/0204 370/329 |
| 2008/0057941 A1 | 3/2008 | Scott et al. |
| 2009/0019283 A1* | 1/2009 | Muralidharan ....... H04L 63/065 713/168 |
| 2011/0040969 A1* | 2/2011 | Yao ............... H04W 12/06 713/168 |
| 2012/0066186 A1 | 3/2012 | Wohlert |
| 2013/0072108 A1 | 3/2013 | Spurgat et al. |
| 2013/0176901 A1* | 7/2013 | Merlin ............... H04W 28/06 370/255 |
| 2014/0122242 A1* | 5/2014 | Stephenson ....... G06Q 30/0267 705/14.64 |
| 2014/0233547 A1* | 8/2014 | Vallabhu ............... G06F 9/44 370/338 |
| 2014/0236493 A1 | 8/2014 | Park et al. |
| 2015/0117424 A1* | 4/2015 | Jeong ............... H04W 48/16 370/338 |

OTHER PUBLICATIONS

Copenheaver, Blaine R., "Patent Cooperation Treaty International Search Report and Written Opinion dated Dec. 30, 2014", Patent Cooperation Treaty Application No. PCT/US2014/056089, Patent Cooperation Treaty, Dec. 30, 2014.

Fan, John, "Advisory Action dated Mar. 23, 2016", U.S Appl. No. 14/093,943, The United States Patent and Trademark Office, Mar. 23, 2016.

Fan, John, "Final Office Action dated Dec. 17, 2015", U.S. Appl. No. 14/093,943, The United States Patent and Trademark Office, Dec. 17, 2015.

Fan, John., "Non-final Office Action dated Jul. 27, 2016", U.S Appl. No. 14/093,943, The United States Patent and Trademark Office, Jul. 27, 2016.

* cited by examiner

SERVICE DISCOVERY USING A NETWORK

PRIORITY

This application claims priority to U.S. Provisional Patent Application Ser. No. 61/880,681 filed on Sep. 20, 2013, entitled "Enhanced Multiple Media Device Infrastructure." The entirety of this previously filed application is hereby incorporated by reference.

BACKGROUND

A media device may provide one or more services accessible to other media devices. For example, a first media device may provide a content streaming service while a second media device provides a content display service. Networks of media devices may employ service discovery techniques to announce available services to other media devices.

Figure 1:
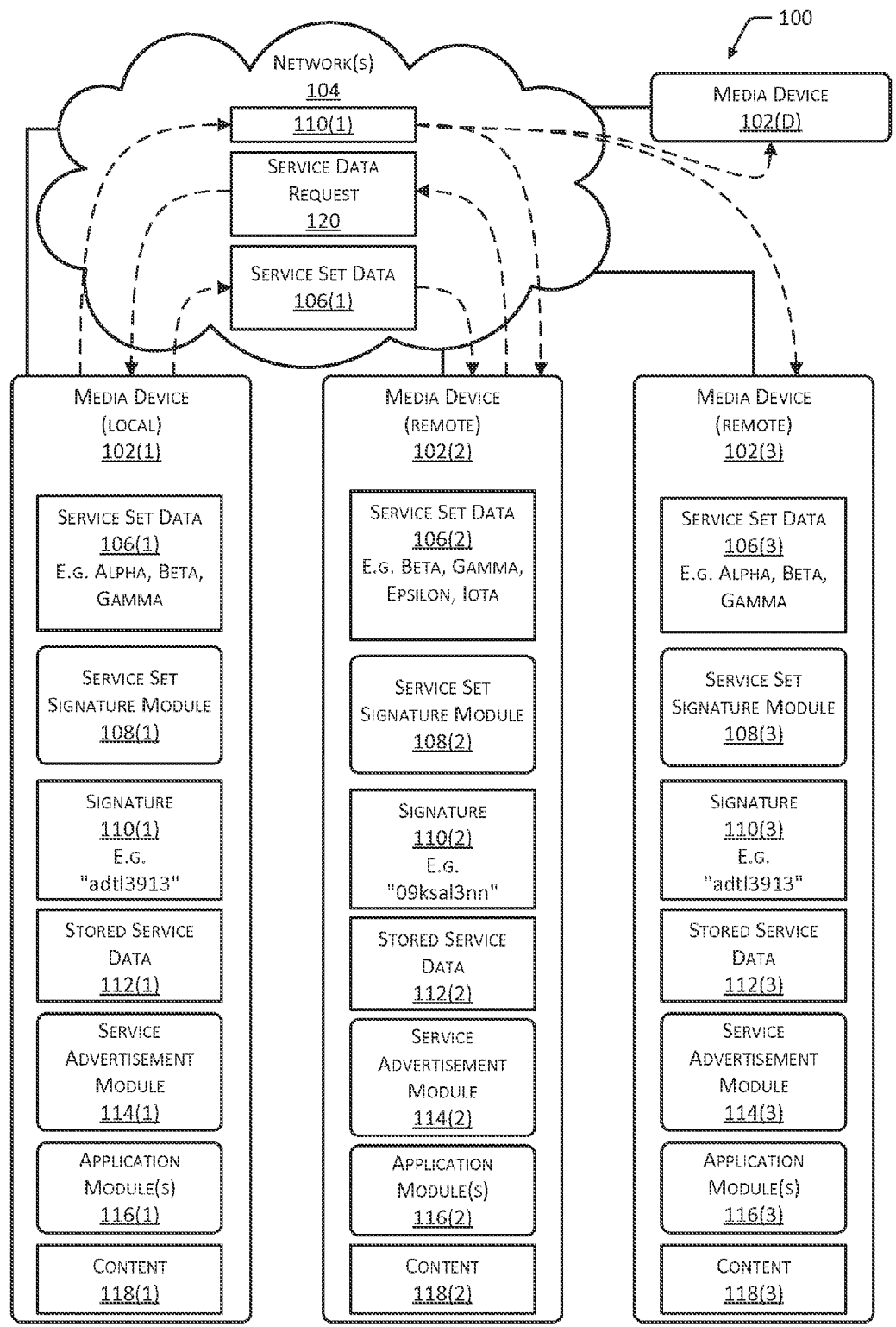
FIG. 1 is a system for providing service discovery using a signature indicative of a particular service set of those services available for execution on a media device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Content such as video, music, games, applications, and so forth may be consumed using a variety of media devices. These media devices may include remote controls, televisions, set-top boxes, tablet computers, laptop computers, desktop computers, media players, home automation devices, sensors, and so forth. The media devices may be configured to communicate with one another or other devices using one or more networks. The media devices may have one or more services which are available to provide various functions. These services may be used by the media device itself, or may be used by other media devices. For example, a set-top box may provide a streaming service which delivers video content to a television running a video presentation service.

Benefits may be provided to users by providing service discovery which may enable the media devices to exchange information about the services available on other media devices. For example, the presentation services available on a new television added to a user's home network may be easily accessible with little or no configuration, improving the user experience by reducing or eliminating manual setup steps to allow use of the services on the media devices. The media devices may interact with one another in a peer-to-peer ("P2P") fashion, which may not maintain a centralized or authoritative repository of information. Service discovery technologies such as multicast Domain Name System ("mDNS") and Universal Plug and Play ("uPNP") allow for distribution of information about services available on media devices in communication with one another in P2P networks.

However, the number of media devices on a network continues to grow, as does the number of services provided by those media devices. As a result, the bandwidth used by these existing service discovery technologies continues to increase. This increase consumes bandwidth that would otherwise be available for transferring content or other operations. Furthermore, the traffic generated by these service discovery technologies consumes electrical power to send and receive, particularly in media devices using wireless communications. Media devices with electrical power constraints, such as a battery-powered tablet computer or smartphone, may experience a decrease in usable operating time due to the increased traffic consuming battery power to send and receive the service information.

Described in this disclosure are techniques and systems for optimizing service discovery in a networked environment. Media devices participating in service discovery use information about a set of available services to generate service set data. For example, a media device may have first service set data indicating three services available, "Alpha", "Beta", and "Gamma".

A service set signature module processes the service set data to generate a signature. This processing may use a hash or other function which provides a deterministic output from one or more inputs. As a result, a particular signature may be distinctive to a particular service set. The signature may be an alphanumeric string, binary data, and so forth. The signature may have a predetermined fixed length, or minimum/maximum length. Continuing the example, the signature may be a string "adtl3913". The signature and the service set data may be stored as stored service data. The stored service data thus designates a correspondence between the signature and the service sets. For example, the first service set signature of "adtl3913" indicates a device has available the services "Alpha", "Beta", and "Gamma".

A service advertisement module may be configured to include or incorporate the signature into beacon data transmissions or broadcasts on the network. For ease of discussion and not by way of limitation, the term "broadcast" includes broadcasting, anycasting, multicasting, unicasting, geocasting, and so forth, unless otherwise indicated in this disclosure. In one implementation, the broadcast may include sending data to a broadcast network address or a multicast network address on the local area network. These beacon data transmissions are associated with the normal operation of the network, and need use additional transmissions dedicated to service discovery. For example, the beacon name transmitted by a wireless network interface of the set-top box may include the signature indicative of the service set on the set-top box.

Other media devices on the network may generate the signature for their respective local service sets. Upon receiving the beacon data transmission which includes the signature, the local service set signature module may compare the received signature with the local signature, or other previously received signature data stored in the stored service data.

A match between the local and received signatures indicates that both media devices have the same service set. In this case, the local media device may associate that same service set to the other media device. Similarly, the received signature may be compared against previously stored signatures in stored service data. Thus, a match provides information about the set of services available on the transmitting device, without sending the details of those services. On a given network many devices may be present, with several of these devices having identical service sets. The signatures enable the receiving device to use information about the service set(s) which is already available thereon, reducing network traffic and power consumption associated with the transmission and reception of that information.

A received signature which is unmatched to signatures in the stored service data is indicative of an unknown service sets. Based on this, the receiving media device may send a request to the sending media device which transmitted the broadcast, requesting service set data. The service set data may include detailed information about the service set of the sending media device. The receiving media device may receive the service set data, and add that service set data and the corresponding signature to the locally stored service data. Further comparisons of received signatures may thus be made against the stored service data.

The stored service data may be preloaded or populated. For example, a media device manufacturer may distribute stored service data which includes the signatures and corresponding service sets for media devices in their product line. This stored service data may be updated from time-to-time. Such preloading may reduce or eliminate the incidence of requests for service set data, further reducing an overall resource footprint associated with the service discovery.

In some implementations, the techniques described may be used to convey non-service information, such as hardware version, operating system version, software version, and so forth. For example, the signature may indicate that a computer device has a particular set of installed hardware.

Service discovery facilitates the interoperation of media devices which are in communication with one another using one or more networks. By using these techniques, the data traffic on the network which is associated with service discovery may be significantly reduced. Use of existing beacon data or broadcasts associated with a networking protocol used by the media device for other functions further reduces overhead associated with the service discovery.

These techniques may provide more bandwidth on the network for other uses, such as distributing content from one device to another. Additionally, power consumption may be reduced due to the decreased transmission and reception of traffic on the network interface(s). For battery-powered media devices such as remote controls, tablet computers, smartphones, laptops, and so forth, the reduction in power consumption may improve the usable operating time of that media device.

Illustrative System

FIG. 1 is a system 100 for providing service discovery. The system includes media devices 102(1), 102(2), . . . , 102(D). As used in this disclosure, letters in parenthesis such as "(D)" indicate an integer value. These media devices 102 may include televisions, tablet computers, personal computers, electronic book readers, gaming consoles, set-top boxes, media players, in-vehicle entertainment systems, portable media players, smartphones, servers, sensors, home automation systems, and so forth.

Content 118 may be consumed, processed, distributed, and so forth by groups of two or more media devices 102. The content 118 may include audio, video, electronic books, games, and so forth. The content 118 may be downloaded or streamed from a content provider for consumption, processing, storage, and so forth on the media device 102.

The media devices 102 may couple to one or more networks 104. The networks 104 may be personal area networks ("PANs"), local area networks ("LANs"), wide area networks ("WANs"), and so forth. The networks 104 may interconnect with one another facilitating communication between the media devices 102. The LANs may be supported using an access point topology, ad-hoc peer-to-peer topology, and so forth. For example, the media devices 102 may communicate with one another using Wi-Fi™ Direct as promulgated by Intel Corporation. The LANs may be wired, wireless, or a combination. The LANs may be implemented using Ethernet, Wi-Fi™, Bluetooth®, ZigBee, and so forth. Within the system 100, several different networks 104 may coexist. For example, media device 102(1) and 102(6) may be connected to one another using Wi-Fi, while the media device 102(2) and 102(5) may be interconnected using Bluetooth®. The connections may be between media devices 102 which are on the same or different PANs, LANs, or WANs.

While connected to the network(s) 104, the media device (s) 102 may send beacon data, broadcasts, and so forth. For example, on a Wi-Fi network, the media device 102 may periodically transmit a beacon frame which may include data such as a device identifier, type of device, and other information such as the signatures described below. In some implementations, the network 104 may operate in an ad-hoc mode, such that data is exchanged without the use of an access point. For example, the media devices 102 may be configured to communicate with one another using a peer-to-peer mechanism such as Wi-Fi™ Direct.

The media devices 102 may execute, or have available for execution, one or more services. These services may be configured to interact with the content 118 by receiving and processing the content 118 for presentation, generating a stream of content 118 for presentation, providing various functionality, and so forth. Other services may provide for data processing, data retrieval, data storage, and so forth. Service set data 106 is indicative of those services available on the media device 102. For example, the service set data 106 may indicate that services "Alpha", "Beta", and "Gamma" are available on the media device 102. As services are added, removed, enabled, disabled, and so forth, the service set data 106 changes accordingly. The service set data 106 may indicate current state, and may include historical information.

A service set signature module 108 is configured to access the service set data 106 and generate a signature 110. The signature 110 may comprise a string, binary, or other data which are indicative of the service set data 106. The string may comprise a string which may be alphabetic, numeric, alphanumeric, and so forth. The signature 110 may be of a fixed or variable length. In implementations where variable length is used, minimum and maximum lengths may be defined. The length of the signature 110 may be limited such as to allow inclusion in beacon data or broadcast header of a network interface. For example, the generation of the signature 110 may be constrained to produce the local signature with a data size less than or equal to a predetermined size. The predetermined size may be determined based on the size of a field within the beacon frame. The predetermined size may be smaller than the size of the field. In one implementation, the signature 110 may be included in a frame body of a management frame such as a beacon frame which is at least partially compliant with the 802.11 standard promulgated by the Institute for Electrical and Electronics Engineers ("IEEE"). In another example, the signature 110 may be included in, or in place of, the service set identification ("SSID") information in the beacon data frame. In another implementation, the signature 110 may be stored in the service set identifier ("SSID") field of the beacon frame.

The service set signature module 108 may use one or more data processing functions to generate the signature 110. For example, the media device 102(1) may have a service set data 106(1) including the "Alpha", "Beta", and "Gamma" services. Based on this service set data 106(1), the service set signature module 108(1) generates the signature 110(1) which comprises a string "adtl3913". The processing function may be deterministic, such that for a given input of service set data 106, the same signature 110 is output. The processing function may comprise a hash. The processing functions may be configured to provide a signature 110 having a fixed length or variable length. In some implementations, the signature 110 may include check values or other information. These values may be used to affirm validity, provide for error checking, and so forth.

In some implementations, the signature 110 may encode the service set data 106. Such an encoded signature 110 may then be decoded to provide information about the set of services. The service set signature module 108 may also be configured to encode the service set data 106 to generate the signature 110, or decode signatures 110 and output the service set data 106. This encoding may use a lossless compression technique to store the information indicative of the one or more services.

In yet another implementation, the signature 110 may be associated with service set data 106 by way of a data structure such as a lookup table. For example, the lookup table (or other data structure) may store the service set data 106 and corresponding signatures 110. In this implementation, the generation of the signature 110 comprises a lookup or retrieval based on the service set data 106 to find the corresponding signature 110. For example, the data structure may associate a particular combination of one or more services that are associated with a particular signature 110. Continuing the example, the table may comprise data indicative of unique sets of the one or more services associated with a unique or particular signature 110. In this implementation, the signature 110 may be a random or pseudo-random value, serving to act as an identifier.

Stored service data 112 may be maintained in memory of the media device 102. The stored service data 112 provides an association between signatures 110 and service set data 106. The stored service data 112 may include the local service set data 106 and corresponding local signature 110 for the local media device 102, as well as information received from other media devices 102, or other sources. In one implementation, the stored service data 112 may be generated prospectively and automatically based on various permutations of services which could be provided.

A service advertisement module 114 is configured to provide the signature 110 to other media devices 102. For example, the service advertisement module 114 may configure a networking protocol stack to include the signature 110 within at least some of the beacon data frames transmitted by the media device 102 onto the network 104. The service advertisement module 114 may also access signature data 110 acquired from other media devices 102. Continuing the example, beacon data frames received by way of the network 104 may be processed received and then accessed by the service advertisement module 114 to extract the signature data 110. This signature data 110 may then be used to determine the service set data 106 for the media devices 102 which sent their respective signatures 110. The service advertisement module 114 may also respond to service data requests 120, as described below.

The media device 102 may also include one or more application modules 116. These application modules 116 may comprise content players, browsers, digital rights management tools, and so forth. These application modules 116 may provide one or more services. For example, the content player application may provide a service to receive content 118 for presentation on the media device 102.

As described above, several media devices 102 may be connected to the network(s) 104, allowing for the exchange of data between these devices 102. In situations, the communication protocols associated with the network 104 may involve the use of beacon data or broadcasts. For example, the media devices 102 using a Wi-Fi™ interface to connect to the network 104 may be configured to broadcast beacon data. The beacon data may comprise a frame at a data link layer of the protocol. Typical usage of the beacon data may be to coordinate operation of the network 104. The beacon data may comprise information which is indicative of the media device 102, and may also contain fields for containing other data, such as a human-readable device name.

The service advertisement module 114 may be configured to access the signature 110 of the media device 102 and insert the signature 110 into the beacon data. Once inserted, subsequently transmitted beacon data from the media device 102 will include the signature 110.

Other media devices 102 on the network 104 may receive the signature 110. For example, the networking protocol stacks of the media devices 102(2) and 102(3) may receive the broadcast frames and store this data. The other media devices 102(2), . . . , 102(D) are "remote" or separate from the media device 102(1). These remote media devices 102 (2)-(D) may be similarly configured to the local media device 102(1). As a result, they may have a corresponding signature 110(2)-(D), which is indicative of their respective local service set data 106(2)-(D). For example, the media device 102(2) has a local service set data 106(2) indicating that services "Beta", "Gamma", "Epsilon", and "Iota" are available. From this service set data 106(2), the service set signature module 108(2) generated the signature 110(2) of "09ksal3nn".

The service advertisement modules 114(2)-(D) of the respective media devices 102(2)-(D) access the received signatures 110(1) transmitted by the media device 102(1). The service set signature module 108(2)-(D) of the remote media devices 102(1)-(D) processes the received signature 110(1) to determine a match with the local signatures 110(2)-(D) or other signature data stored in the stored service data 112(2)-(D). When a match is detected, the associated service set data 106 may be accessed. As a result of this comparison, the services available on the media device 102(1) are now known to the remote media devices 102(2)-(D) which have a matching signature 110 and corresponding service set data 106. For example, the media devices 102(1) and 102(3) have the same service set of "Alpha", "Beta", and "Gamma". As a result, they have identical signatures 110(1) and 110(3) of "adtl3913". Because the remote media device 102(3) already has information in its service set data 106(3) due to its own services executing locally, the media device 102(3) having knowledge of the matching signatures 110 has no need to receive more information to know what services are available on the media device 102(1).

In some situations, the received signature 110(1) may not match the signatures 110 in the stored service data 112. For example, as shown here the media device 102(2) may have a service set data 106(2) indicating available services of "Beta", "Gamma", "Epsilon", and "Iota". The corresponding signature 110(2) for this service set data 106(2) is a string "09ksal3nn". Based on a string comparison between "adtl3913" and "09ksal3nn", the two strings are dissimilar and do not match. Assuming the stored service data 112(2) does not contain a signature 110 of "09ksal3nn", the media device 102(2) does not have information about the services available on the media device 102(1). Based on this, the media device 102(2) may send a service data request 120. The service data request 120 seeks information about the service set data 106.

The media device 102(1) may receive the service data request 120. Based on this request 120, the service advertisement module 114(1) may provide information such as the service set data 106(1) to the requesting media device 102(2).

The remote media device 102(2) receives the service set data 106(1) and may store the service set data 106(1) in memory. The service advertisement module 114(2) retrieves the service set data 106(1) and adds this information to the stored service data 112(2). The media device 102(2) now has discovered the services available on the media device 102(1). Continuing the example, another media device 102(5) having the same set of services may join the network 104. Beacon data transmissions from this device 102(5) include the signature 110 value of "09ksal3nn". Based on this beacon data transmission, the media device 102(2) knows that the services available on the media device 102(5) are the same. As a result, transmission of the service set data 106(5) is unnecessary, reducing demands on network bandwidth, processor usage, power consumption, and so forth.

The media devices 102 may use their respective modules to distribute their signatures 110, and exchange service set data 106 when encountering unmatched signatures 110. Because the signatures 110 comprise a relatively small amount of data, they may be incorporated into frames which are already scheduled for or typically sent on the network 104, thus reducing or eliminating the need to send dedicated service announcement data to other media devices 102. As a result, service discovery on the network(s) 104 is improved.

Figure 2:
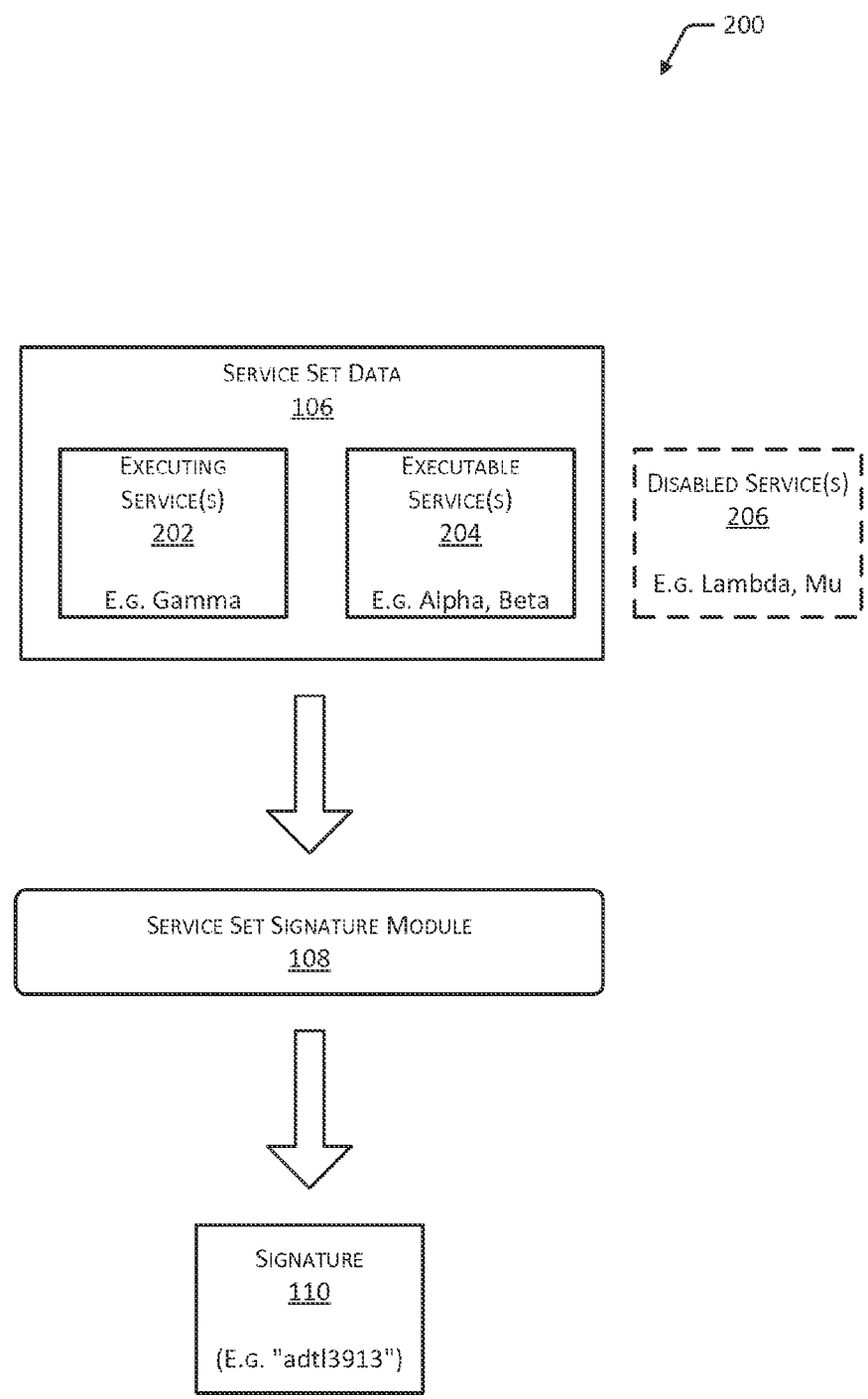
FIG. 2 is a block diagram of service set data and corresponding signature.

FIG. 2 is a block diagram 200 of service set data 106 and a corresponding signature 110. The service set data 106 is indicative of those services available on the media device 102. Services may be deemed available when they are executing 202 or are executable 204. Executing services 202 have one or more threads running on the processor. The executable services 204 are those which may begin running, but are not currently. For example, the executable 204 services may have suspended or inactive threads. The service set data 106 may omit disabled service(s) 206 or otherwise unavailable or uninstalled services.

As illustrated here, the service set data 106 may indicate that services "Alpha", "Beta", and "Gamma" are available on the media device 102, but only the service "Gamma" may be actively executing on the processor. As services are added, removed, enabled, disabled, and so forth, the service set data 106 changes accordingly. The service set data 106 may indicate current state, and may include historical information.

As described above, the service set signature module 108 may use the service set data 106 to generate the signature 110. In some implementations, the signature 110 may vary according to the sequence of the services in the service set data 106. This may comprise a sequence as listed, execution sequence, process identification sequence, version number sequence, service identifier associated with each service, and so forth. For example, the service set data 106(X) of "Epsilon", "Gamma", "Rho" may result in a signature 110(X) of "2022smc" while the service set data 106(Y) "Epsilon", "Rho", "Gamma" may result in signature 110(Y) of "zd0029". In other implementations, the operation of the service set signature module 108 may be independent of the sequence.

Figure 3:
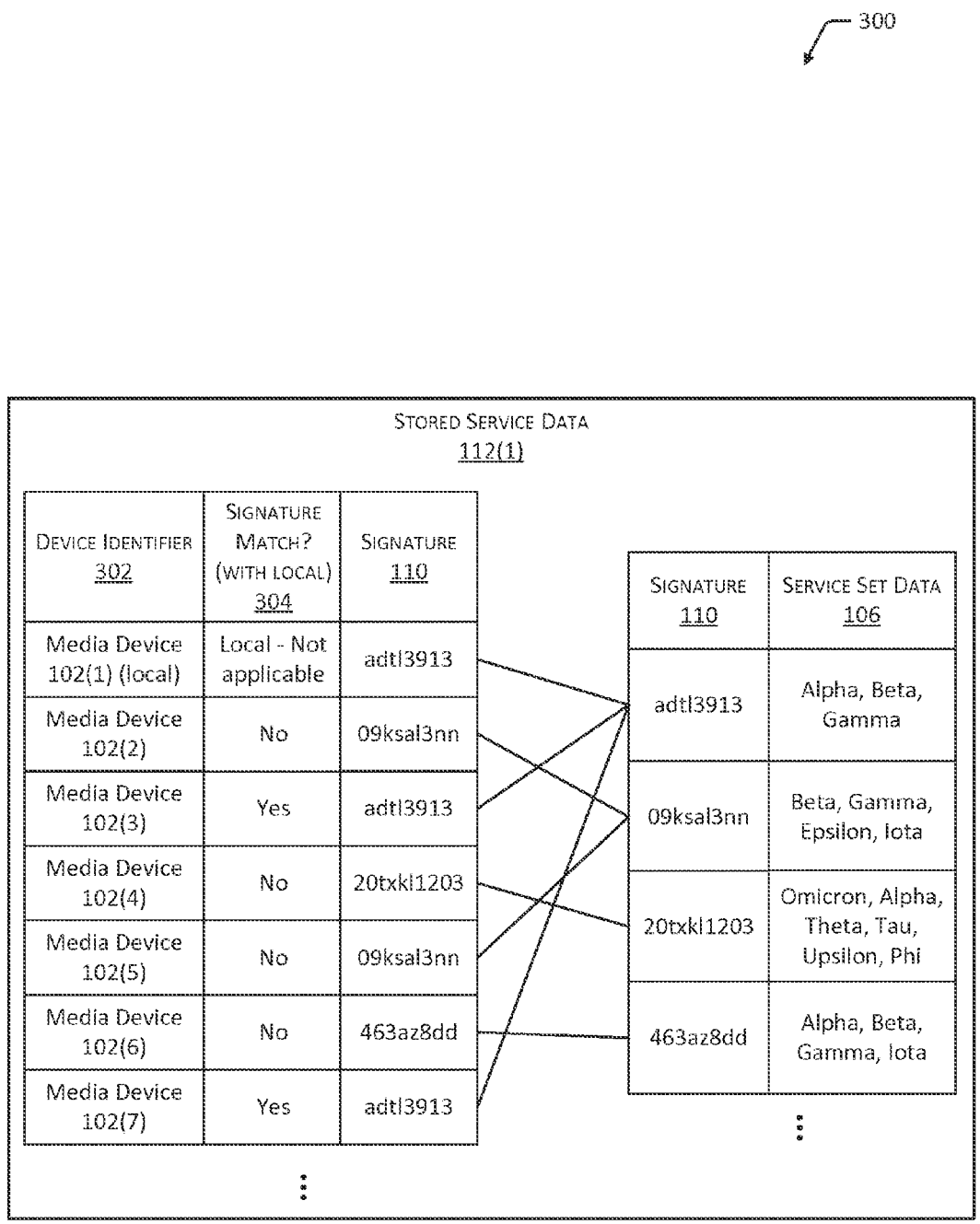
FIG. 3 is a block diagram of stored service data indicating associations between different devices and their associated signature values and service set data.

FIG. 3 is a block diagram 300 of stored service data 112 indicating associations between different media devices 102 and their associated signature values 110 and service set data 106. These associations may comprise table entries, pointers, key-value pairs, and so forth.

As the media devices 102 send their signatures 110, other information may be included in the transmission, or inferred therefrom. For example, the beacon data frame may include a device identifier 302 as well as the signature 110 data. This device identifier 302 may be stored within the stored service data 112. The device identifier 302 may include one or more of a media access control address, internet protocol address, device serial number, and so forth.

Also illustrated is a signature match 304 field, containing data indicative of a string match between the local signature 110 and the received signature(s) 110. For example, the stored service data 112(1) from the media device 102(1) indicates that the media devices 102(3) and 102(7) have matching signatures 110, and thus the same service set as available on the media device 102(1).

The signatures 110 are associated with corresponding service set data 106. As described above, this may be service set data 106 from one or more of the local or remote media devices 102. For example, the service set data 106 indicative of "Beta", "Gamma", and "Epsilon" is associated with the media devices 102(2) and 102(5).

The stored service data 112 is illustrated as a table for ease of illustration, and not by way of limitation. In other implementations, the stored service data 112 may be stored as a flat file, database, linked list, tree, executable code, or other data structure.

Figure 4:
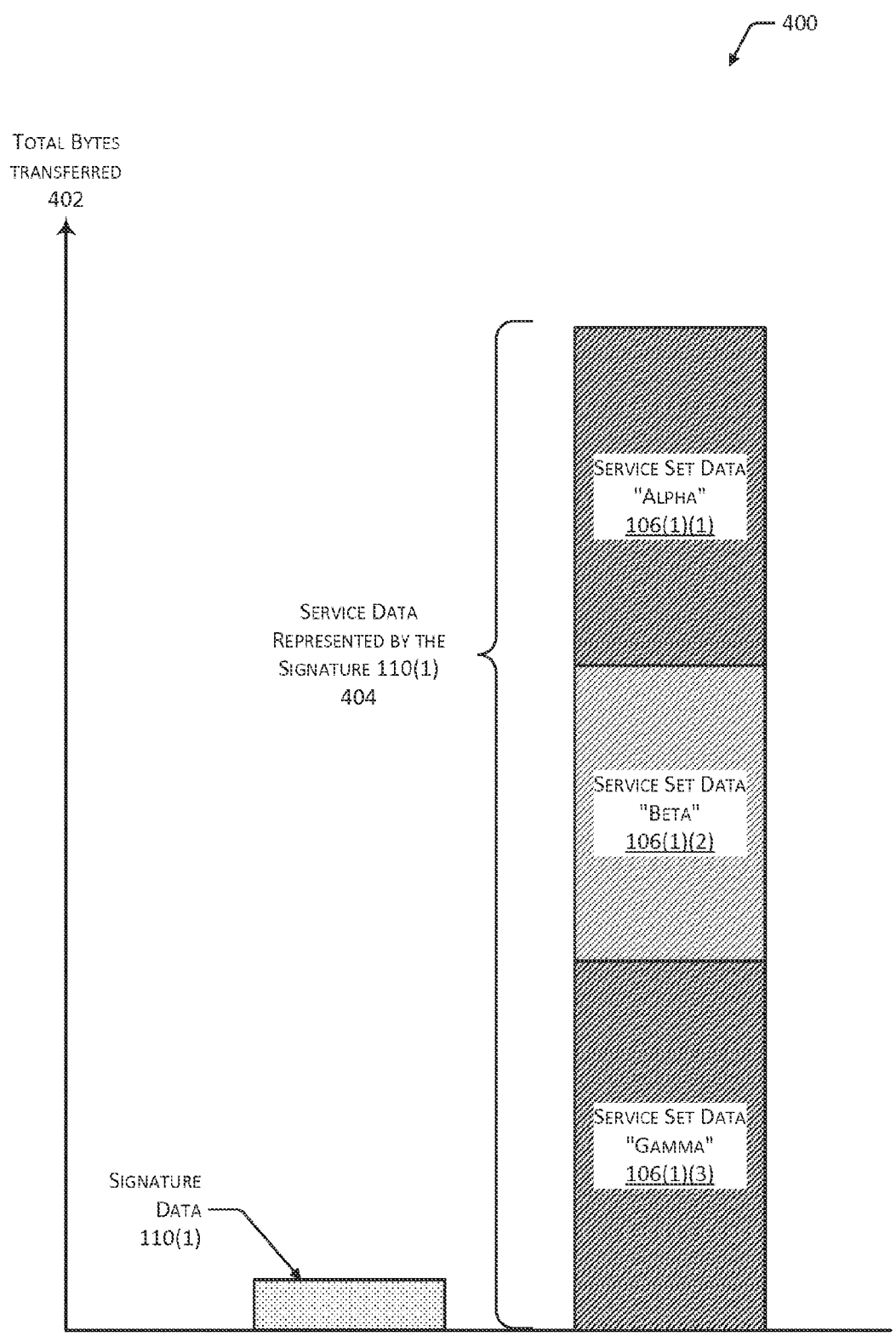
FIG. 4 is a graph illustrating the total bytes transfer of a signature compared to service set data.

FIG. 4 is a graph 400 illustrating the total bytes transferred of a signature 110 compared to service set data 106. In this graph, the vertical axis 402 indicates total bytes transferred. Depicted is the signature data 110(1) and a corresponding group of service data represented by the signature 110(1) 404. In terms of bytes to transfer, the signature 110 may be quite small, such as under 100 bytes. In comparison, the service set data 106 which is descriptive of the different services available on the media device 102 may be many times larger, such as several kilobytes.

As a result of this size differential, the overall resource footprint associated with providing service discovery is reduced compared to conventional techniques. For example, reduced bytes to transfer may result in power savings on devices due to reduced data transmit and receive times.

Figure 5:
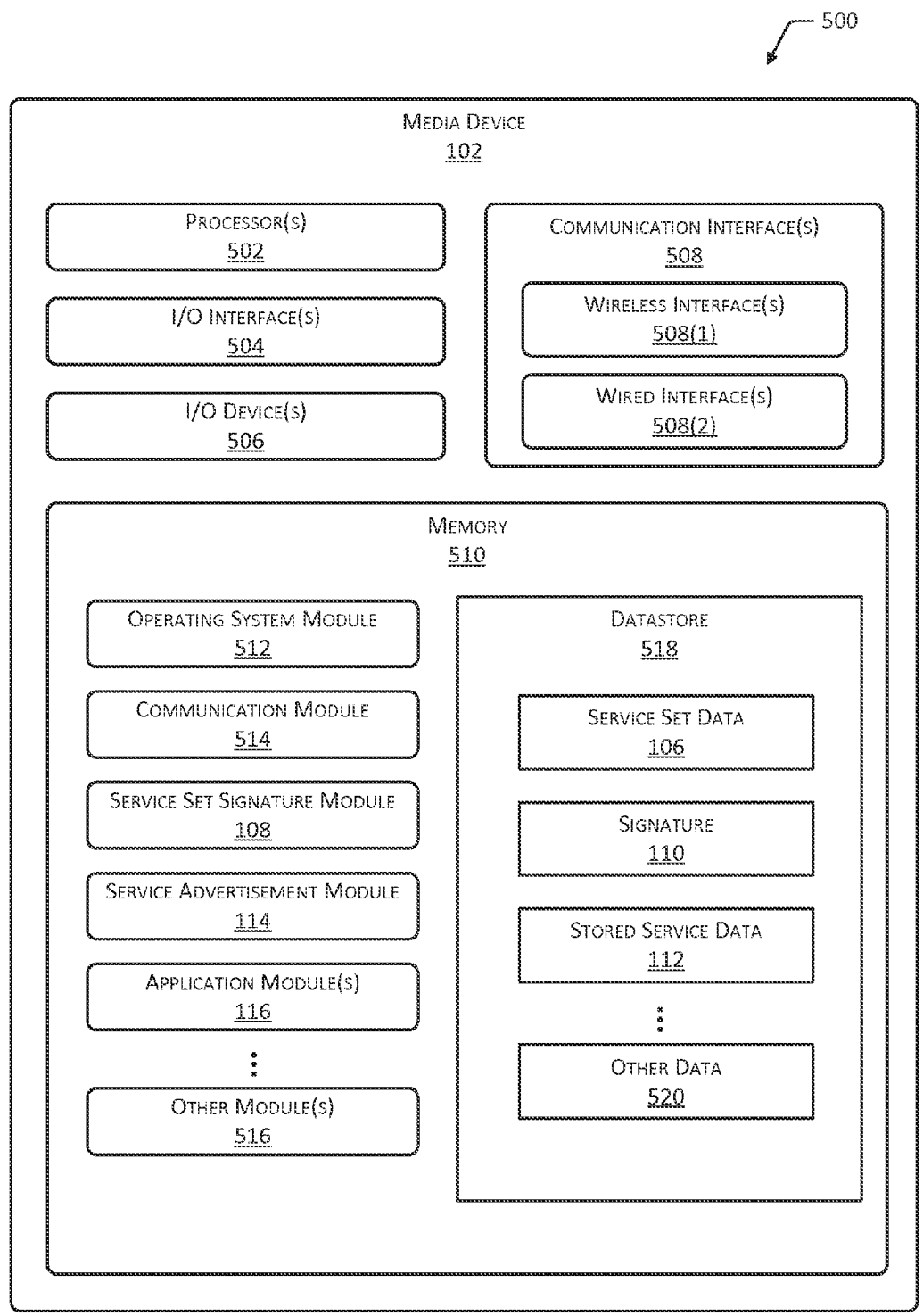
FIG. 5 illustrates a block diagram of a media device which may use the signature to determine service set data of other media devices.

FIG. 5 illustrates a block diagram of the media device 102 which may use the signature 110 to determine service set data 106 of other media devices 102. The media device 102 may include one or more processors 502 configured to execute one or more stored instructions. The processors 502 may comprise one or more cores. The media device 102 may include one or more input/output ("I/O") interface(s) 504 to allow the processor 502 or other portions of the media device 102 to communicate with other devices. The I/O interfaces 504 may comprise inter-integrated circuit ("I2C"), serial peripheral interface bus ("SPI"), Universal Serial Bus ("USB") as promulgated by the USB Implementers Forum, RS-232, and so forth.

The I/O interface(s) 504 may couple to one or more I/O devices 506. The I/O devices 506 may include input devices such as one or more of a keyboard, sensors, accelerometers, and so forth. The I/O devices 506 may also include output devices such as one or more of a display, printer, and so forth. In some embodiments, the I/O devices 506 may be physically incorporated with the media device 102 or may be externally placed and communicatively coupled thereto.

The media device 102 may also include one or more communication interfaces 508. The communication interfaces 508 are configured to provide communications between the media device 102 and other devices, routers, access points, and so forth. The communication interfaces 508 may include devices such as transceivers configured to couple to one or more networks 104 and send and receive data. The one or more networks 104 may include local area networks, wide area networks, and so forth. These may include wireless interfaces 508(1), wired interfaces 508(2), optical interfaces, acoustic interfaces, and so forth. The wireless interfaces 508(1) may include an interface compliant with at least a portion of the 802.11 standard promulgated by the IEEE.

The media device 102 may also include one or more busses or other internal communications hardware or software that allow for the transfer of data between the various modules and components of the media device 102.

As shown in FIG. 5, the media device 102 includes one or more memories 510. The memory 510 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 510 provides storage of computer readable instructions, data structures, program modules, and other data for the operation of the media device 102.

The memory 510 may include at least one operating system ("OS") module 512. The OS module 512 is configured to manage hardware resource devices such as the I/O interfaces 504, the I/O devices 506, the communication interfaces 508, and provide various services to applications or modules executing on the processors 502. Also, stored in the memory 510 may be one or more of the following modules. These modules may be executed as foreground applications, background tasks, daemons, and so forth.

A communication module 514 is configured to support communication between the media devices 102 using one or more networks 104. For example, the communication module 514 may implement a transmission control protocol/internet protocol ("TCP/IP") stack for communication. Other functionality such as encryption, session authentication, and so forth may also be provided.

The memory 510 may also store the service set signature module 108. As described above, the service set signature module 108 is configured to generate the signature 110 using as input the service set data 106 for services executing on the media device 102. The service set signature module 108 may process the received signatures 110 to evaluate against the signatures 110 in the stored service data 112. As described above, a match between the received signature 110 and the signature 110 in the stored service data 112 is indicative of the media device 102 which sent the received signature 110 having the same set of services as that with the corresponding signature 110. In other words, the signature 110 received from the remote media device 102 provides knowledge of the available services on the remote media device 102.

In some implementations, the service set signature module 108 may process service set data 106 from other sources. This service set data 106 may be used to generate the corresponding signatures 110 for storage in the stored service data 112 and later comparison against received signatures 110.

The service advertisement module 114 may be stored in the memory 510. This module provides the signature 110 to other media devices 102. For example, the service advertisement module 114 may configure a networking protocol stack to include the signature 110 within at least some of the beacon data frames transmitted by the media device 102 onto the network 104. The service advertisement module 114 may also access signature 110 acquired from other media devices 102. Continuing the example, beacon data frames received by way of the network 104 may be received and then accessed by the service advertisement module 114 to extract the signature 110. This signature 110 may then be used to determine the service set data 106 for the media devices 102 which sent their respective signatures 110.

The service advertisement module 114 may also respond to service data requests 120. For example, the service advertisement module 114(1) of the media device 102(1) may receive a service data request 120 from the media device 102(2). Responsive to receiving this request 120, the service advertisement module 114(1) of the media device 102(1) sends the service set data 106(1) to the media device 102(2).

The application modules 116 may also be stored in the memory 510. These application modules 116 may comprise content players, browsers, digital rights management tools, scripting engines, and so forth. These application modules 116 may provide one or more of the services. For example, a digital rights management tool may provide unlocking services to other applications. Other modules 516 may also be present. For example, an authentication module may determine the identity of the operator of the media device 102.

The memory 510 may also include a datastore 518 to store information. The datastore 518 may use a flat file, database, linked list, tree, executable code, or other data structure to store the information. In some implementations, the datastore 518 or a portion of the datastore 518 may be distributed across one or more other devices including servers, network attached storage devices, and so forth.

As depicted here, the datastore 518 may store the service set data 106, the signature 110, the stored service data 112, and so forth. Other data 520 such as user preferences, configuration data, and so forth may also be stored in the datastore 518.

Figure 6:
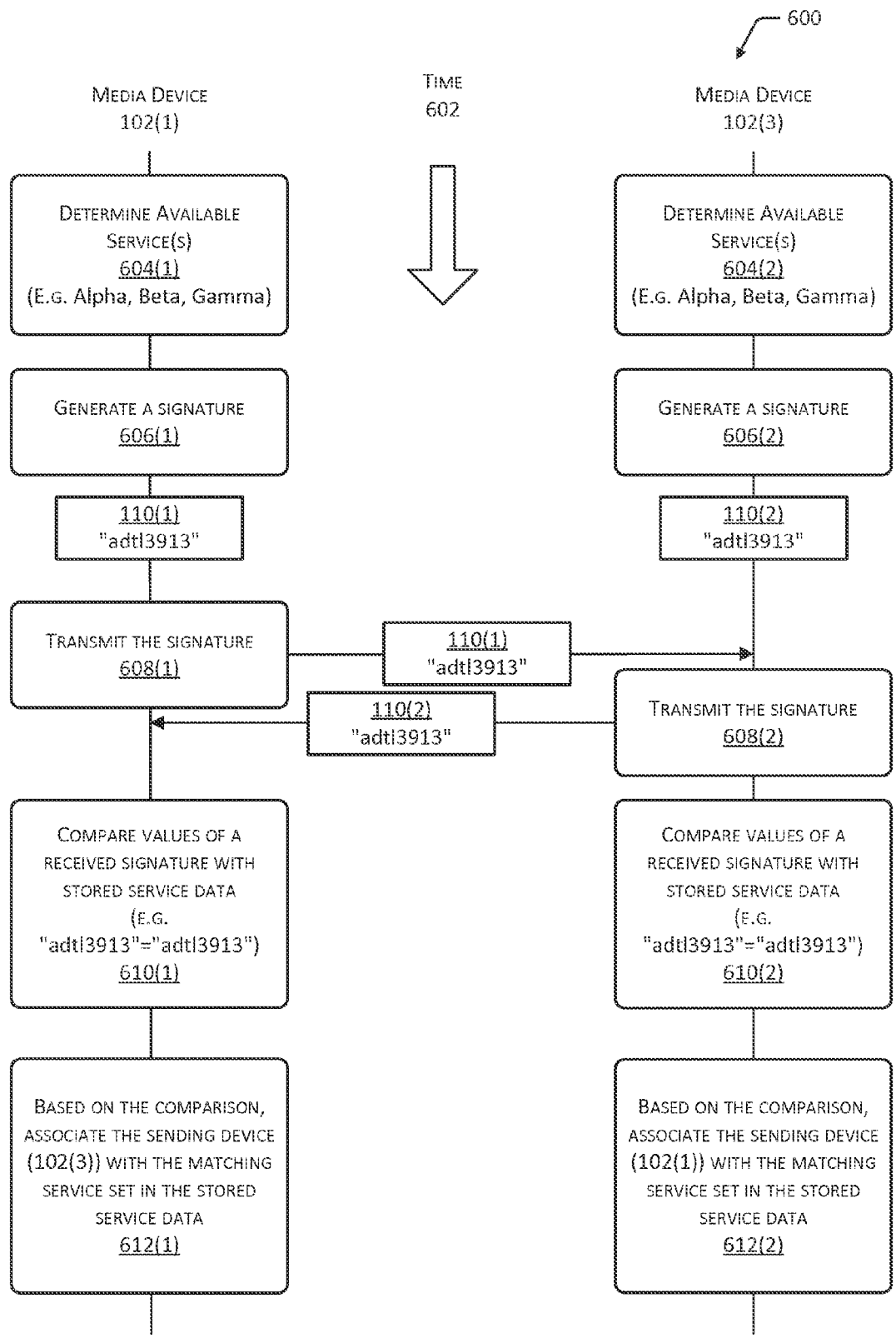
FIG. 6 illustrates a flow diagram of a process of determining a service set of another media device using the signature.

FIG. 6 illustrates a flow diagram 600 of a process of determining a service set of another media device 102 using the signature 110. This diagram depicts two devices 102(1) and 102(3) for illustration and not by way of limitation. Time 602 increases down the page as indicated by the arrow.

Block 604 determines the service set data 106 which indicates the (locally) available services 604(1) and 604(2) on the respective media devices 102(1) and 102(3). For example, the service set signature module 108 may request from the OS module 512 information about the services executing on the processor(s) 502 or available for execution on the processor 502. In one implementation, the local service set data 106 indicative of the one or more services available for execution on the local media device 102 may be accessed from memory 510. In the illustration presented here, the media devices 102(1) and 102(3) are executing the same set of services, "Alpha", "Beta", and "Gamma".

Block 606 generates a (local) signature 110. As described this may involve the use of a hashing function or other technique, which uses the service set data 106 as an input. The signature 110 may be a fixed length, or may be variable length. For example, the service set signature module 108 may generate the (local) signatures 110(1) and 110(3). Because the service set data 106(1) and 106(3) are the same, the signatures 110(1) and 110(3) are the same, having the alphanumeric string "adtl3913".

Block 608 transmits the signature 110. As shown here, the media device 102(1) transmits the signature 110(1) while the media device 102(2) transmits the signature 110(2). The transmission may include sending the signature 110 as part of a beacon data frame, broadcast frame, and so forth. As described above, the service advertisement module 114 may use other transmissions sent via the network 104 to distribute the signature 110. For example, the beacon data frames which are used during normal operation of the wireless network may be modified to include the signature 110 information. In this way, the distribution of the signatures 110, and thus information about service availability, may be provided without necessarily increasing the amount of traffic on the network 104. Broadcasting of the signature 110 may include anycasting, multicasting, unicasting, geocasting, and so forth. In other implementations, these transmissions may be specifically designated to disseminate the signature 110 and dedicated to service discovery. For example, a connection may be opened with a particular receiving media device 102 and the signature 110 may be transmitted.

The signature 110 may thus be incorporated into at least a portion of the data exchanged with other media devices 102. For example, packet headers may be modified to include the signature 110.

The transmission of the signature 110 may be periodic, triggered by a particular condition being reached, and so forth. For example, a trigger may be that, upon detecting change in the service set data 106, a transmission is sent advertising the change. A particular media device 102 may operate in a "quiet" mode in that it may not transmit its signature 110, but may still receive signatures 110 for use in discovering services on other media devices 102. Similarly, some media devices 102 may transmit a signature 110 indicative of available services, but may not receive or process the signatures 110, operating in a "loud" mode. In some implementations, the service advertisement module 114 may transition between the regular mode of transmitting and receiving, the quiet mode of listening only, or the loud mode of transmitting only.

Block 610 compares the values of a received signature 110 with the stored service data 112. As described above, the stored service data 112 may include the local signature 110 and the local service set data 106, as well as previously received service set data 106 and the associated signatures 110. The comparison may comprise an exact match, partial match, and so forth. For example, in some implementations the received signature 110 and a stored signature 110 may be deemed to match when the first n characters are identical, where n is an integer value greater than zero.

Based on the comparison, block 612 associates the sending media device 102(3) with the matching service set in the stored service data 112. In this illustration, the signature 110(2) received by the media device 102(1) matches the signature 110(1) of the internal service set data 106(1). As a result, the sending media device 102(3) is associated with that same set of services, "Alpha", "Beta", and "Gamma".

With this association made, the receiving media device 102 knows the service(s) available on the sending media device 102. Thus, the media device 102(1) knows the services available on the media device 102(3), and vice versa. This knowledge has been provided using minimal resources of the participating media devices 102 and the network 104. The media devices 102 may use this information for other operations. For example, the media device 102(1) may send a stream of video to the media device 102(3) for presentation on a display of that device using the "Gamma" service.

Figure 7:
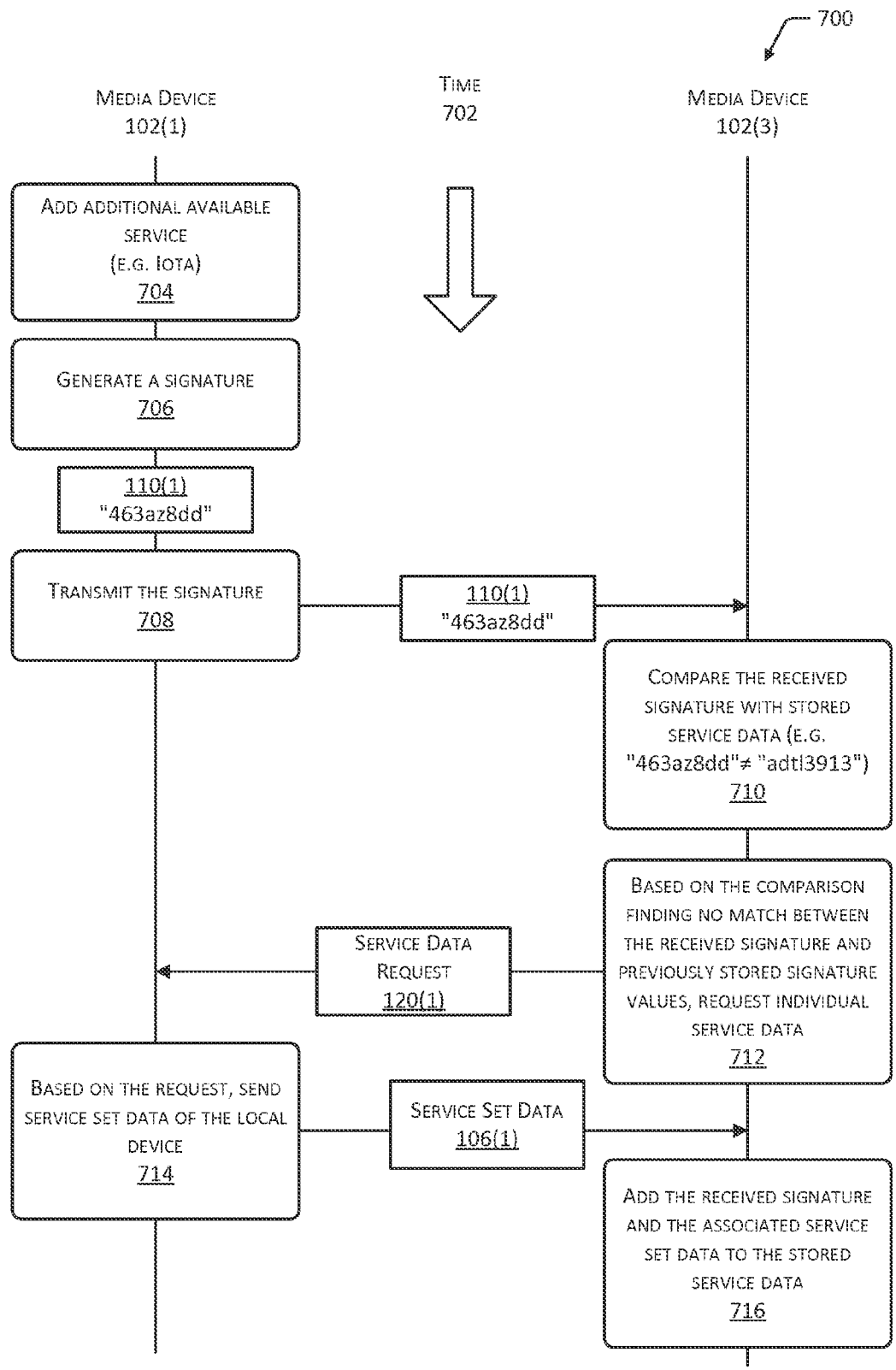
FIG. 7 illustrates a flow diagram of a process of a media device requesting service set data for unmatched signatures.

FIG. 7 illustrates a flow diagram 700 of a process of the media device 102 requesting service set data 106 for an unmatched signature 110. This diagram again depicts the two devices 102(1) and 102(3) for illustration and not by way of limitation. Time 702 increases down the page as indicated by the arrow.

Block 704 adds an additional available service to the media device 102(1). This service may be actively executing on the processor(s) 502, or may be available for execution. For example, a new service may have been installed and registered with the OS module 512 on the media device 102(1). In this example, the service "Iota" has been added, thus the service set data 106 is now "Alpha", "Beta", "Gamma", and "Iota". While this example illustrates the addition of a service, in other implementations other changes in the service set data 106 may precede the following blocks. For example, a service may be disabled, uninstalled, locked to prevent remote use, and so forth.

Block 706 generates a signature 110(1), as described above. In this example, given the now different service set data 106, the signature 110(1) "463az8dd", which is representative of the set of services "Alpha", "Beta", "Gamma", and "Iota".

Block 708 transmits the signature 110(1). As above, this transmission may be a broadcast, part of an established connection, or otherwise transferred using the network(s) 104.

Block 710, on the receiving media device 102(3), receives the signature 110(1) and compares it with the stored service data 112. For example, the receiving media device 102(3) may be configured to receive and process beacon data, broadcasts, and so forth. As above, the signature 110(1) may be compared with the stored service data 112. In this illustration, the signature 110 of the media device 102(1) is the string "463az8dd", which does not match the local signature 110(3) of "adtl3913" on the receiving media device 102(3).

Block 712, based on the comparison finding no match between the received signature 110(1) and the previously stored signature 110(3), requests individual service data. The request made by block 712 may include sending the service data request 120 described above. As described above, the match may be a complete match, or a partial match. With no match found, the receiving media device 102(3) may have no knowledge of the services available on the sending device 102(1). For example, where the signature 110 comprises a hash value, it may not be possible to recover the list of services used to create the signature 110. In comparison, the signature 110 may comprise encoded data, such as a list of the services which have been compressed. In this situation, the encoded data may be decoded and used to determine the service set of the sending media device 102.

Block 714 on the media device 102(1), based on the receipt of the service data request 120(1), sends the service set data 106(1) to the receiving media device 102(3). This may be sent to the requesting media device 102(3), or to one or more of the media devices 102 on the network 104. For example, a series of broadcast packets may be used to distribute the service set data 106(1) to all devices on the network 104. In another example, a series of connections may be opened between the requesting media device 102(3) and the sending media device 102(1) to facilitate data transfer.

Block 716, on the receiving media device 102(3), may then add the received signature 110(1) (now "463az8dd") and the corresponding service set data 106 indicative of the services of "Alpha", "Beta", "Gamma", and "Iota" to the stored service data 112. The media device 102(3) now has information indicative of the services available on the media device 102(1).

Figure 8:
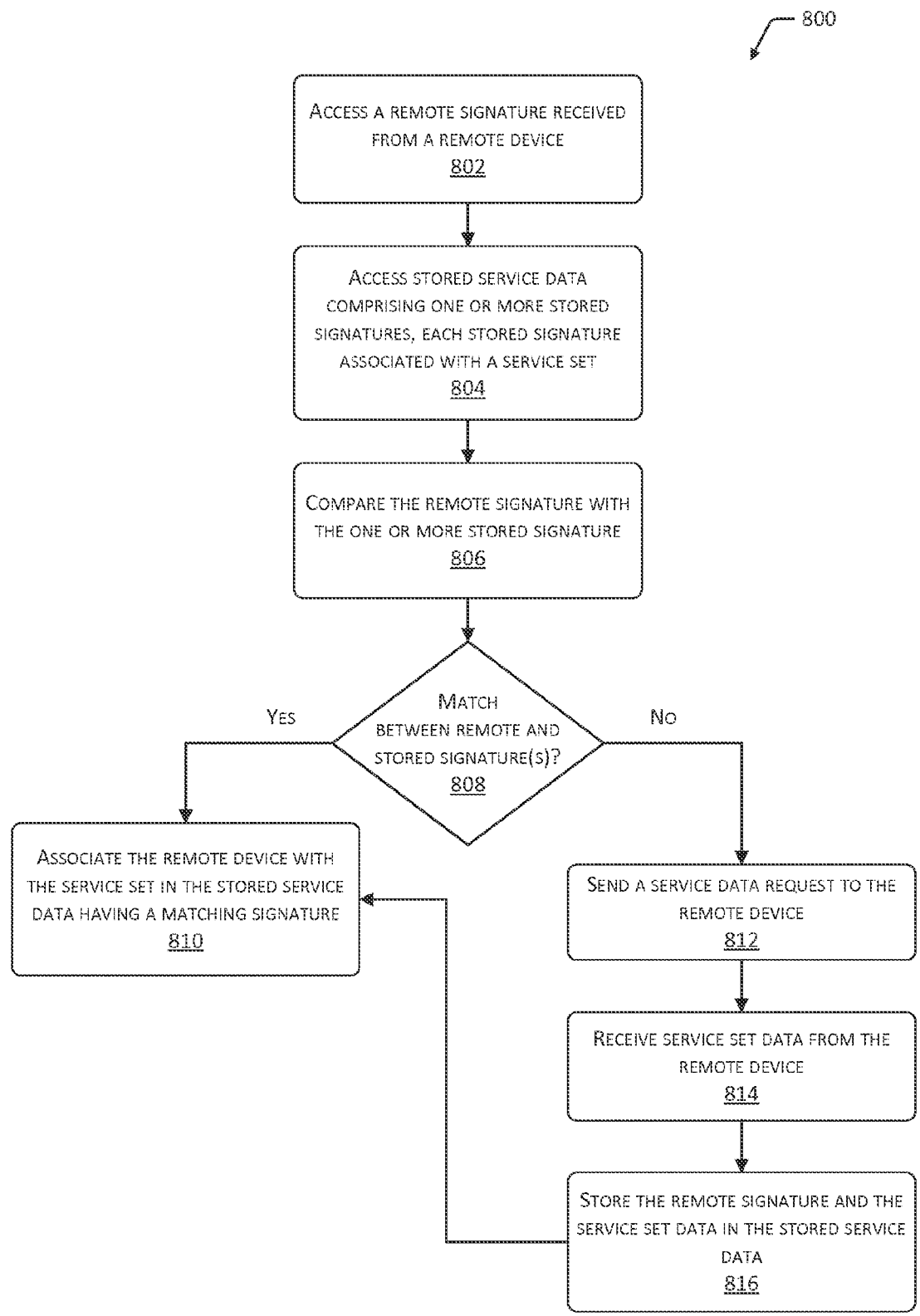
FIG. 8 illustrates a flow diagram of a process of using a signature to determine a set of services available on another media device.

FIG. 8 illustrates a flow diagram of a service discovery process 800 using a signature 110 to determine a set of services available on another media device 102. This process may be executed at least in party by the media device 102.

Block 802 accesses a remote signature 110 received from a remote device 102 which is external to the local device 102. For example, the media device 102(3) has stored in the memory 510 the signature 110(1) received from the media device 102(1).

Block 804 accesses the locally stored service data 112. As described above, the stored service data 112 may comprise one or more stored signatures 110 and associated service set data 106. For example, each signature 110 may be associated with a particular service set data 106 indicative of a particular set of services.

As described above, in some implementations the local service set data 106 is indicative of one or more services available for execution on the local device 102. The local signature 110 may be generated using as input the local service set data 106, and stored in the stored service data 112.

Block 806 compares the remote signature 110 with the one or more stored signatures 110. For example, a compare function may be used to determine if the signatures 110 are equivalent. In some implementations, equivalency may include an exact match between the compared signatures 110. In another example, a find function may be used, such finding one or more signatures 110 indicates a match, while finding no signatures 110 indicates no match. As described above, this comparison may be for the entire signature 110, or for a portion thereof.

Block 808 determines a match between the remote signature 110 and the stored signatures 110. When a match is determined, such as when the received signature 110 is equivalent to one of the signatures 110 in the stored service data 112, the process proceeds to block 810.

Block 810 associates the remote media device 102 with the service set in the stored service data 106 having a matching signature 110, or are otherwise equivalent to one another. For example, the media device 102(3) may associate the signature of "atdl3913" as received from the media device 102(1) with the service set data 106 indicating that the services "Alpha", "Beta", and "Gamma" are available. The associating may include updating a data structure by way of one or more of modifying a pointer value, a key value, a table entry, a table referent, and so forth. For example, the association may create a pointer in the stored service data 112 which links the device identifier 302 with the service set data 106. The local media device 102(3) now has knowledge of the services available on the remote media device 102(1). In some implementations, instead of or in addition to the association, the matching service set data 106 may be copied to a memory location storing information associated with the remote media device 102. For example, the local service set data 106 which has a matching signature 110 may be copied to a memory location associated with the service set data 106 of the remote media device 102.

Returning to block 808, when no match is determined, such as when the received signature 110 is different from or dissimilar to the signatures 110 in the stored service data 112, the process proceeds to block 812. Block 812 sends a service data request 120 to the remote media device 102. For example, the media device 102(3) may send the service data request 120 to the media device 102(1).

Block 814 receives the service set data 106 from the remote media device 102. Continuing the example, the media device 102(1) may send the service set data 106(1) to the media device 102(3) based on receiving the request 120.

Block 816 stores the remote signature 110 and the service set data 106 in the stored service data 112. For example, the signature 110(1) and the service set data 106(1) may be stored in the stored service data 112(3). In some implementations, the process may proceed to block 810 and associate the remote media device 102 with the, now present, service set data 106 in the stored service data 112.

With the knowledge of the services available, the local media device 102 may send a request to the remote media device 102 to use one or more of the services in the matching service set 106 which are available for execution on the remote device 102. Continuing the example, the local media device 102(3) may request to use service "Alpha" on the remote media device 102(1).

As used in this disclosure, the terms "local", "remote", "sending" or "receiving" are relative to a particular media device 102. For example, the media device 102(2) is "remote" relative to the media device 102(1), while the media device 102(1) is "remote" relative to the media device 102(2).

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A local device comprising:
   a communication interface comprising a transceiver configured to send and receive data;
   a memory storing computer-executable instructions; and
   a processor communicatively coupled to the communication interface and the memory, and to execute the computer-executable instructions to:
      access local service set data, the local service set data indicative of one or more services available for execution on the processor of the local device to provide one or more functions;
      generate a local signature, the local signature comprising an alphanumeric string generated by a hash function, wherein input to the hash function includes input data representative of at least a portion of the local service set data;
      receive from a remote device external to the local device, using the communication interface, remote beacon data comprising a remote signature, the remote signature comprising an alphanumeric string generated by the hash function, wherein the input data includes remote service set data, the remote service set data indicative of one or more services available to provide at least one function upon execution on a processor of the remote device;
      determine the local signature and the remote signature are different;
      send a request to the remote device for remote service set data;
      receive remote service set data; and
      store the remote service set data in the stored service data.

2. The system of claim 1, wherein the generation of the local signature is constrained to produce the local signature with a data size less than or equal to a predetermined size; and further comprising computer-executable instructions to:
   generate beacon data comprising the local signature stored in a field of a frame body, wherein a data size of the field is greater than or equal to the predetermined size; and
   send, using the communication interface, the beacon data.

3. The system of claim 1, wherein the communication interface is compliant with at least a portion of the 802.11 standard promulgated by the Institute for Electrical and Electronics Engineers, the local device and the remote device are operating in an ad-hoc mode, and the remote beacon data comprises a beacon frame compliant at least in part with the 802.11 standard, and further wherein the remote signature is stored in a service set identifier field of the beacon frame.

4. A computer-implemented method executable on a local device, the method comprising:
   accessing stored service data comprising one or more stored signatures associated with one or more stored service sets, wherein each of the one or more stored service sets is indicative of one or more services, the one or more services available for execution on a processor of the local device to provide one or more functions;
   accessing a remote signature, the remote signature indicative of one or more services available for execution on a remote device external to the local device, the one or more services available for execution on a processor of the remote device to provide one or more functions;
   determining the remote signature is different than one of the one or more stored signatures;
   sending a request to the remote device for remote service set data;
   receiving remote service set data; and
   storing the remote service set data in the stored service data.

5. The computer-implemented method of claim 4, further comprising:
   associating the remote signature with the remote service set data.

6. The computer-implemented method of claim 4, further comprising:
   determining the remote signature matches one of the one or more stored signatures;
   associating the remote device with a matching service set comprising one of the one or more stored service sets; and
   sending a request to the remote device to use one or more of the services available for execution as indicated by the matching service set which are available for execution on the remote device.

7. The computer-implemented method of claim 4, further comprising:
   accessing local service set data indicative of the one or more services available for execution on the local device; and
   generating a local signature using input data representative of at least a portion of the local service set data as input to a hash function.

8. The computer-implemented method of claim 7, further comprising:
   sending beacon data comprising the local signature.

9. The computer-implemented method of claim 4, further comprising:
   joining a wireless network;
   sending a request for service set data using the wireless network;
   receiving remote service set data using the wireless network; and
   storing the remote service set data in the stored service data.

10. The computer-implemented method of claim 4, wherein the signatures are generated using a hash function, wherein input to the hash function includes the service set data indicative of the one or more services.

11. The computer-implemented method of claim 4, wherein the signatures are associated with particular combinations of the one or more services by way of a table, the table comprising data indicative of unique sets of the one or more services associated with a unique signature.

12. The computer-implemented method of claim 4, wherein the signatures are generated by way of lossless data compression using as input information indicative of the one or more services.

13. The computer-implemented method of claim 4, wherein the one or more services available for execution comprise services designated for use by remote devices and either: executing on a processor, or executable on the processor.

14. A computer-implemented method executable on a local device, the method comprising:
    accessing local service set data indicative of one or more services available for execution on the local device;
    accessing local service set data indicative of one or more services available for execution on the local device;
    sending the local signature using a communication interface;
    receiving a remote signature, the remote signature indicative of one or more services available for execution on a remote device external to the local device;
    determining the local remote signature and the remote signature are different;
    sending a request to the remote device for remote service set data;
    receiving the remote service set data;
    storing the remote service set data in the stored service data; and
    associating the remote signature with the remote service set data.

15. The computer-implemented method of claim 14, wherein the generating the local signature is constrained to produce the local signature with a data size less than or equal to a predetermined size; and inserting the local signature into a field of a beacon frame compliant with at least a portion of the 802.11 standard promulgated by the Institute for Electrical and Electronics Engineers, wherein the field is greater than or equal to the predetermined size.

16. The computer-implemented method of claim 14, the sending comprising transmitting to a broadcast network address or a multicast network address on a local area network.

17. The computer-implemented method of claim 14, further comprising:
    receiving a remote signature, the remote signature indicative of one or more services available for execution on a remote device;
    determining the local remote signature and the remote signature are equivalent; and
    copying the local service set data to a memory location associated with the remote service set data.

18. The computer-implemented method of claim 14, further comprising:
    receiving, using the communication interface, a request for the local service set data from a remote device; and
    sending the local service data set to the remote device using the communication interface.

19. The computer-implemented method of claim 14, wherein the local signature is generated using a hash function, wherein input to the hash function includes the service set data indicative of the one or more services.

20. The system of claim 1, the computer-executable instructions to:
    determine the local signature and the remote signature are equivalent; and
    update stored service data in the memory of the local device to associate the remote device with the local service set data, wherein the updated stored service data comprises one or more of a pointer, key value, or table referent which establishes a correspondence between a device identifier of a device and service set data for the device.

* * * * *